United States Patent [19]
Lee et al.

[11] Patent Number: 5,485,011
[45] Date of Patent: Jan. 16, 1996

[54] TWO-SIDED INTEGRATED-CIRCUIT PIR SENSOR PACKAGE

[75] Inventors: Wade P. Lee, Lafayette; Donald R. Sandell, San Jose, both of Calif.

[73] Assignee: Larry C. Y. Lee, Haywood, Calif.

[21] Appl. No.: 190,645

[22] Filed: Jan. 28, 1994

[51] Int. Cl.$^6$ .............................. G01J 5/00; H01L 27/02
[52] U.S. Cl. .................................. 250/338.1; 250/338.2; 250/338.3
[58] Field of Search .................... 250/338.1, 338.2, 250/338.3, DIG. 1

[56] References Cited

U.S. PATENT DOCUMENTS

| | | | |
|---|---|---|---|
| 3,877,308 | 4/1975 | Taylor | 250/338.3 |
| 4,336,452 | 6/1982 | Baker | 250/338.3 |
| 4,437,003 | 3/1984 | Doctor | 250/338.3 |
| 5,178,464 | 1/1993 | Fraden | 250/338.1 |

FOREIGN PATENT DOCUMENTS

| | | | |
|---|---|---|---|
| 0117420 | 6/1986 | Japan | 250/338.3 |

Primary Examiner—Constantine Hannaher
Assistant Examiner—Virgil O. Tyler
Attorney, Agent, or Firm—Elliot B. Aronson

[57] ABSTRACT

A two-sided passive infrared integrated-circuit sensor package for use in infrared motion detectors as well as other infrared sensing applications. The integrated-circuit sensor package has a casing with viewing windows transmissive to infrared radiation on opposite sides. Infrared sensing elements are mounted within the integrated circuit package so that both sides of the sensing elements are able to receive infrared radiation through the viewing windows from the areas in front of and behind the integrated-circuit package. By this simple mechanical change in the package and sensing element mounting, the area of sensitivity of the sensor is effectively doubled with no change in the electronic design of the circuit and with no increase in the number or size of the infrared-sensitive sensing elements within the IC package.

1 Claim, 1 Drawing Sheet

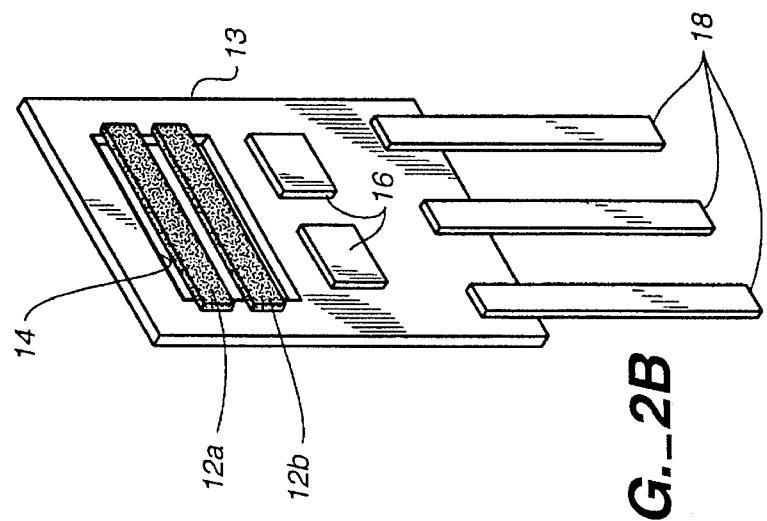
FIG._2B
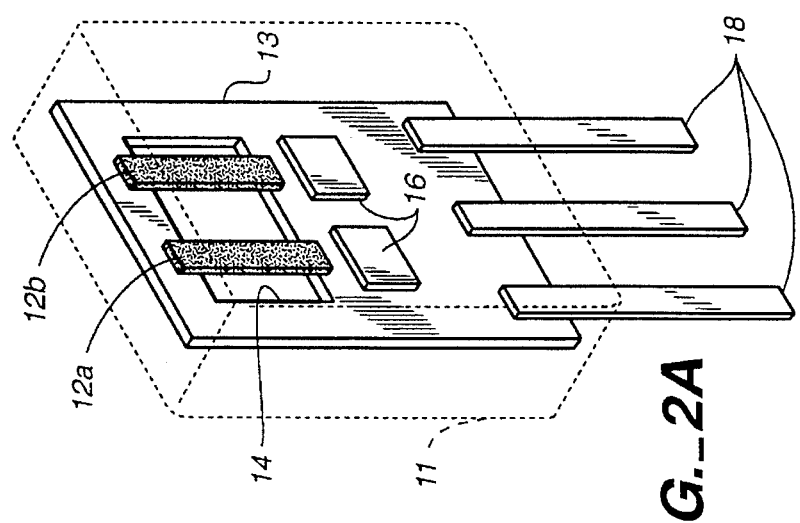
FIG._2A
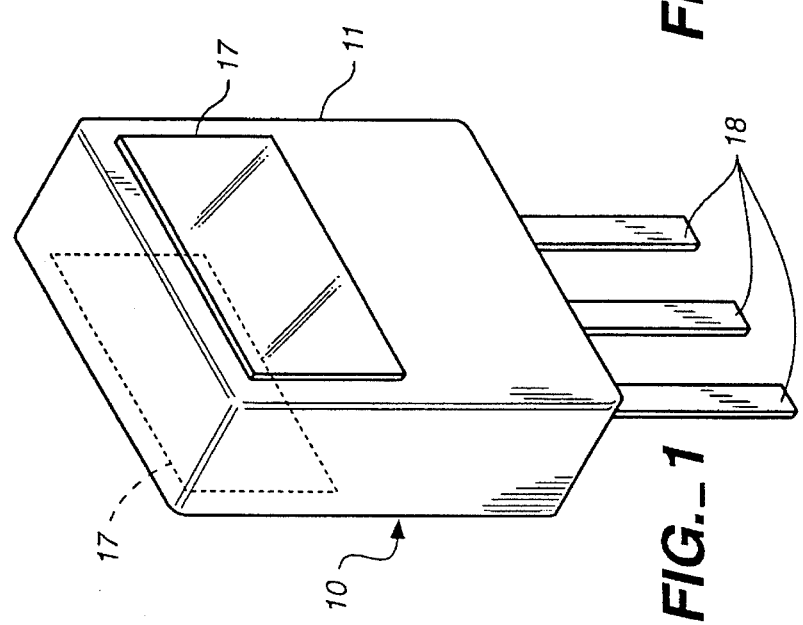
FIG._1

TWO-SIDED INTEGRATED-CIRCUIT PIR SENSOR PACKAGE

BACKGROUND OF THE INVENTION

The present invention relates to integrated circuit packages for passive infrared sensor.

Passive infrared (PIR) integrated-circuit sensors are integrated-circuit packages, or "chips" as they are called in the technical vernacular, that receive infrared radiation and provide an electrical output signal representing the received infrared radiation. They are used in a wide variety of devices such as infrared motion detection devices. The motion detector devices are commonly used in automatic light switches and security systems to turn on a light or to activate some other form of alarm or warning indicator when a person or other suitably warm object enters a monitored area. These motion detector devices may be used in residential lighting, for example, to illuminate a walkway as a person approaches the front door or to illuminate a driveway as a car approaches. They are also popular as energy saving devices in large office buildings or industrial plants, which may have hundreds of rooms to be illuminated day and night. The motion detection devices can save considerable energy and cost by automatically extinguishing the lights in unoccupied rooms.

Passive infrared motion detector devices function by sensing heat in the form of infra-red radiation emanating from a person or similarly warm object as the person or object enters or moves about in the field of view of the device. An arrangement of mirrors and/or lenses directs the incident infra-red radiation to one or more of the integrated-circuit PIR sensor chips, and when the sensor chip or chips detect an appropriate heat impulse, the motion detector device provides an electrical signal to activate the light or other alarm.

In the many practical applications of PIR motion detectors, it is advantageous to provide wider and wider fields of view. Known PIR sensor chips, however, are limited in the field of view over which they are sensitive. These integrated-circuit sensor packages typically include one or more planar sensing elements which are irradiated through a window on the surface of the IC package. These IC sensor packages are most sensitive to head-on radiation, incident at 90° to the window surface. Their sensitivity drops off the more the incident radiation approaches the sensor from the side, i.e., the more the radiation approaches the sensor at a glancing angle. To achieve a wide field of view, known motion detectors generally require complicated, or costly, optical arrangements for directing the infrared radiation from the outlying reaches of the desired field of view into the significantly narrower angular reach of the sensor sensitivity. Some motion detectors have achieved wider fields of view by compounding a plurality of integrated-circuit sensor packages, each having its own limited field of view, with optical arrangements that bring the incident radiation to the proper sensor at the proper angle to be perceived. In any event motion detectors with wide fields of view have generally involved a tradeoff among increases in cost, complexity, and the physical size of the motion detector unit, and a compromise in performance. For motion detectors approaching a full 360° field of view the tradeoff is all the more stringent.

SUMMARY OF THE INVENTION

The present invention provides a passive infrared integrated-circuit sensor package for use in infrared motion detectors as well as other infrared sensing applications that effectively doubles the angular range of sensitivity available. The sensor package may be used in motion detectors to provide a very wide field of view without the compromises in cost, performance, and design generally faced by wide-field-of-view motion detectors of the prior art.

Briefly, the invention achieves this result by the simple expedient of providing an integrated-circuit sensor package having a casing with viewing windows on both sides and mounting the sensing elements within the integrated circuit package so that both sides of the sensing elements are able to receive infrared radiation through the viewing windows from the areas in front of and behind the integrated-circuit package. By this simple mechanical change in the package and sensing element mounting, the area of sensitivity of the sensor is effectively doubled with no change in the electronic design of the circuit and with no increase in the number or size of the infrared-sensitive sensing elements within the IC package.

Other aspects, advantages, and novel features of the invention are described below or will be readily apparent to those skilled in the art from the following specifications and drawings of illustrative embodiments.

BRIEF DESCRIPTION OF THE DRAWINGS

FIG. 1 is a perspective view of the exterior of an integrated-circuit infrared sensor package according to the invention.

FIG. 2A is a perspective view showing an interior construction for the integrated-circuit sensor package of FIG. 1.

FIG. 2B is a perspective view showing an alternative interior construction for the integrated-circuit sensor package of FIG. 1.

DETAILED DESCRIPTION OF ILLUSTRATIVE EMBODIMENTS

FIG. 1 shows an embodiment of an integrated-circuit infrared sensor package according to the invention, indicated generally at reference numeral 10, including a casing 11 having a shape known in the field generally as a "flat pack." Casing 11 is shown in phantom in FIG. 2A. Within casing 11 is a pair of infrared sensing elements 12a and 12b responsive to incident infrared radiation. Although illustrated here with two sensing elements, appropriate integrated-circuit packages may be formed with only one or with more than two sensing elements. Sensing elements 12a and 12b are supported on a member 13 included within casing 11. Member 13 is formed to define an aperture 14 and the sensing elements are suspended across the aperture. Sensing elements for the common integrated-circuit sensors are formed of a material that generates an electrical response when it receives infrared radiation. The electrical response is generated when the incident radiation impinges upon the sensing element from either side. Suspending the sensing elements across aperture 14 permits them to receive radiation from both sides, that is, from the area in front of and behind the integrated-circuit package. Member 13 will generally be provided by the integrated-circuit substrate on which is formed the integrated-circuit control electronics, indicated generally in FIGS. 2A and 2B by reference numeral 16. Casing 11 is formed with windows 17 on opposite walls of casing 11 transmissive to infrared radiation to expose the front and rear surfaces of the sensing elements to incident infrared radiation.

The construction of flat pack integrated-circuit infrared sensor packages having a single viewing window and having sensing elements disposed to be illuminated only on one side is well known. A two-sensing-element package with only a single viewing window has been commercially marketed, for example, by Amperex Electronic Corporation of Smithfield, RI, a North American Philips Company, under the series Model Nos. KRX-10 and KRX-11. The details of such construction therefore need not be disclosed here.

The integrated-circuit package of FIGS. 1, 2A and B improves upon the conventional sensor packages such as the Amperex KRX-10 or -11 by the simple expedient of mounting sensing elements 12a and 12b in such a manner that they may be viewed from both sides.

Integrated-circuit package 10 is provided with leads 18 that protrude from casing 11 for attaching the package in an electronic circuit typically on a printed circuit board. Leads 18 provide an electrical connection to the rest of the circuit and also serve to mechanically secure the IC package in a desired position and orientation. In various applications it is sometimes desirable for the sensing elements themselves to have a particular orientation with respect to the orientation of the IC package. For example, in infrared motion detectors an array of lenses and/or mirrors direct infrared radiation to the sensing elements, which may be oriented to be illuminated sequentially as the infrared emitter moves in a particular direction. FIG. 2A shows an embodiment of the invention in which linearly extending sensing elements 12a and 12b are mounted across aperture 14 to extend longitudinally with respect to the attachment leads 18, that is, to extend to and fro with respect to the attachment leads. FIG. 2B shows a comparable embodiment in which the linearly extending sensing elements 12a and 12b are mounted across aperture 14 to extend transversely with respect to the attachment leads 18.

The above descriptions and drawings disclose illustrative embodiments of the invention. Given the benefit of this disclosure, those skilled in the art will appreciate that various modifications, alternate constructions, and equivalents may also be employed to achieve the advantages of the invention. Therefore, the invention is not to be limited to the above description and illustrations, but is defined by the appended claims.

What is claimed is:

1. An integrated-circuit passive infrared sensor package, comprising:

an integrated-circuit casing formed to define first and second viewing windows in opposite sides thereof for passing infrared radiation;

at least one infrared sensing element having a portion consisting of a single sheet of infrared sensitive material with front and rear surfaces responsive to incident infrared radiation; and a member mounted within said casing and defining an aperture positioned within view of said first and second viewing windows;

wherein said at least one infrared sensing element is mounted across said aperture so as to expose said front and rear surfaces of said portion to radiation passing through said first and second viewing windows.

* * * * *